United States Patent [19]
Park et al.

[11] Patent Number: 6,093,752
[45] Date of Patent: Jul. 25, 2000

[54] OPEN-CELL FOAM AND METHOD OF MAKING

[75] Inventors: Chung P. Park, Baden-Baden, Germany; Bharat Chaudhary, Pearland, Tex.; Daniel Imeokparia, Midland, Mich.

[73] Assignee: The Dow Chemical Company, Midland, Mich.

[21] Appl. No.: 09/268,585

[22] Filed: Mar. 15, 1999

Related U.S. Application Data

[60] Provisional application No. 60/078,091, Mar. 16, 1998.
[51] Int. Cl.$^7$ .................................. C08J 9/08; C08J 9/10; C08J 9/12; C08J 9/14
[52] U.S. Cl. ............................. 521/139; 521/79; 521/81; 521/134; 521/140
[58] Field of Search ............................. 521/81, 139, 134, 521/79, 140

[56] References Cited

U.S. PATENT DOCUMENTS

| | | | |
|---|---|---|---|
| 3,117,945 | 1/1964 | Gorham et al. | 260/45.5 |
| 3,573,152 | 3/1971 | Wiley et al. | 161/60 |
| 4,076,698 | 2/1978 | Anderson et al. | 526/348.6 |
| 4,323,528 | 4/1982 | Collins | 264/53 |
| 4,605,682 | 8/1986 | Park et al. | 521/81 |
| 4,824,720 | 4/1989 | Malone | 428/294 |
| 5,055,438 | 10/1991 | Canich | 502/117 |
| 5,057,475 | 10/1991 | Canich et al. | 502/104 |
| 5,096,867 | 3/1992 | Canich | 502/103 |
| 5,411,687 | 5/1995 | Imeokparia et al. | 264/50 |
| 5,424,016 | 6/1995 | Kolosowski | 264/156 |
| 5,674,916 | 10/1997 | Shmidt et al. | 521/79 |
| 5,703,187 | 12/1997 | Timmers | 526/282 |

FOREIGN PATENT DOCUMENTS

| | | | |
|---|---|---|---|
| 0 416 815 A2 | 3/1991 | European Pat. Off. | C08F 10/00 |
| 0 739 906 A1 | 10/1996 | European Pat. Off. | C08F 4/80 |
| 92/19439 | 11/1992 | WIPO | B29C 67/20 |
| 97/22455 | 6/1997 | WIPO | B29C 44/56 |
| 98/58991 | 12/1998 | WIPO | C08J 9/00 |

*Primary Examiner*—Morton Foelak

[57] ABSTRACT

An open-cell polystyrene foam is provided which is formed from a blend of polystyrene and an ethylene-styrene interpolymer. The ethylene-styrene interpolymer functions as a cell opening agent, and is used to control the open cell content of the resulting foam, which may contain greater than 80 percent open cells. The foam is produced by an extrusion process in which carbon dioxide is used as the preferred blowing agent. The resulting foams may be formed into beads, plank, round, sheets, etc.

10 Claims, No Drawings

US 6,093,752

OPEN-CELL FOAM AND METHOD OF MAKING

CROSS-REFERENCE TO RELATED APPLICATIONS

This application claims the benefit of U.S. provisional application No. 60/078,091 filed on Mar. 16, 1998.

STATEMENT REGARDING FEDERALLY SPONSORED RESEARCH OR DEVELOPMENT

Not Applicable

FIELD OF THE INVENTION

The present invention relates to an open-cell foam, and more particularly, to an open-cell foam having a controllable level of open cells, and a method of making such a foam.

The art has recognized that using blends of two thermoplastic resins in the formation of foams may enable one to obtain the advantageous properties of each resin in the resulting foam. For example, foams formed from polystyrene are lightweight and exhibit rigidity and good shape retention, while foams formed from polyolefins have flexibility and good impact absorbing properties. However, blending polyolefin and polystyrene resins has been complicated by the incompatibility of the two resins.

Attempts have been made to solve this incompatibility problem with the use of compatibilizers such as graft or block copolymers which improve adhesion between the two polymer interfaces. However, it has been found that even with the use of a compatibilizer, most polymer blends of polyolefins and polystyrenes are difficult to form into good quality open-cell foams by a conventional extrusion process. Most blended polymer foams formed by extrusion processes result in foams exhibiting poor skins, uneven cell distribution, partial collapse, or weak mechanical strength. This is mainly due to the fact that during the extrusion process, control of the foaming temperature plays a critical role in the formation of a good quality foam, and the foaming temperature range, or "window", is extremely narrow for the formation of open-cell foams. Thus it would be desirable to be able to provide a wider foaming temperature range to ensure formation of a good quality foam.

Attempts have been made to overcome some of these problems. For example, Park, in U.S. Pat. No. 4,605,682 discloses the production of open-cell foams by an extrusion process, from a blend of polystyrene and polyethylene resins, by lightly crosslinking the resins with a peroxide. However, the addition of a peroxide makes the process more complex as the peroxide is highly reactive. In addition, the resulting foam has a low open cell content and is relatively soft, as polyethylene constitutes the major phase of the blend. It would be advantageous to be able to make a foam in which polystyrene is the major phase so that the resulting foam would have a higher compressive strength, making the foam more suitable for construction applications. It would also be desirable to control the level of open cells so as to achieve the desired foam properties.

U.S. Pat. No. 5,411,687 (D. Imeokparia et al.) describes an extruded open cell alkenyl aromatic polymer foam in which a nucleating agent is used in combination with a foaming temperature from 3 to 15° C. higher than the highest foaming temperature for a corresponding closed-cell foam, resulting in an extruded open cell foam having an open cell content of about 30 to about 80 percent.

U.S. Pat. No. 5,674,916 (C. Scmidt et al.) describes a process for preparing an extruded open cell microcellular alkenyl aromatic polymer foam in which a nucleating agent is used in combination with a blowing agent which has a relatively high intrinsic nucleation potential in an amount small enough to allow formation of an open cell structure and a relatively high foaming temperature. This results in an extruded open cell foam having an open cell content of about 70 percent or more and microcellular cell size of 70 microns or less.

WO/9858991 describes a method of enhancing open cell formation using a blend of alkenyl aromatic polymer and up to about seven weight percent of an ethyleneic copolymer having a Vicat softening point of less than or equal to 85° C. (such as ethylvinyl acetate, EVA).

However, use of incompatible polymeric materials such as LLDPE and EVA as a cell opening agent at the foaming temperatures used to generate open cells in the foam body, results a deterioration in the surface quality of the foam.

Thus, there is still a need in the art for a good quality open-cell polymer blend foam and to a process for making the foam which provides a wider foaming temperature window improved surface quality and a controllable level of open cells.

SUMMARY OF THE INVENTION

The present invention meets that need by providing an open-cell foam prepared from a blend of an alkenyl aromatic polymer and a substantially random interpolymer and an extrusion process for its preparation, wherein said foam has a controllable level of open-cells and said process for making the foam provides a wider foaming temperature window, resulting in a foam having improved surface quality and a controllable level of open cells.

Definitions

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The term "hydrocarbyl" as employed herein means any aliphatic, cycloaliphatic, aromatic, aryl substituted aliphatic, aryl substituted cycloaliphatic, aliphatic substituted aromatic, or aliphatic substituted cycloaliphatic groups.

The term "hydrocarbyloxy" means a hydrocarbyl group having an oxygen linkage between it and the carbon atom to which it is attached.

The term "interpolymer" is used herein to indicate a polymer wherein at least two different monomers are polymerized to make the interpolymer. This includes copolymers, terpolymers, etc.

The term "open cell foam" is used herein to indicate a foam having at least 20 percent open cells as measured according to ASTM D 2856-A.

The term "optimum foaming temperature" is used herein to indicate a foaming temperature at or above the blends glass transition temperature or melting point and within a range in which the foam does not collapse.

DETAILED DESCRIPTION OF THE INVENTION

The invention especially covers foams comprising blends of one or more alkenyl aromatic homopolymers, or copolymers of alkenyl aromatic monomers, and/or copolymers of alkenyl aromatic monomers with one or more copolymerizeable ethylenically unsaturated comonomers (other than ethylene or linear $C_3$–$C_{12}$ α-olefins) with at least one substantially random interpolymer.

The alkenyl aromatic polymer material may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer. The alkenyl aromatic polymer material may further include minor proportions of non-alkenyl aromatic polymers. Regardless of composition, the alkenyl aromatic polymer material comprises greater than 50 and preferably greater than 70 weight percent alkenyl aromatic monomeric units. Most preferably, the alkenyl aromatic polymer material is comprised entirely of alkenyl aromatic monomeric units.

Suitable alkenyl aromatic polymers include homopolymers and copolymers derived from alkenyl aromatic compounds such as styrene, alphamethylstyrene, ethylstyrene, vinyl benzene, vinyl toluene, chlorostyrene, and bromostyrene. A preferred alkenyl aromatic polymer is polystyrene. Minor amounts of monoethylenically unsaturated compounds such as $C_{2-6}$ alkyl acids and esters, ionomeric derivatives, and $C_{4-6}$ dienes may be copolymerized with alkenyl aromatic compounds. Examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene.

The term "substantially random" (in the substantially random interpolymer comprising polymer units derived from ethylene and one or more a-olefin monomers with one or more vinyl or vinylidene aromatic monomers and/or aliphatic or cycloaliphatic vinyl or vinylidene monomers) as used herein means that the distribution of the monomers of said interpolymer can be described by the Bernoulli statistical model or by a first or second order Markovian statistical model, as described by J. C. Randall in *POLYMER SEQUENCE DETERMINATION, Carbon-13 NMR Method*, Academic Press New York, 1977, pp. 71–78. Preferably, substantially random interpolymers do not contain more than 15 percent of the total amount of vinyl aromatic monomer in blocks of vinyl aromatic monomer of more than 3 units. More preferably, the interpolymer is not characterized by a high degree of either isotacticity or syndiotacticity. This means that in the carbon$^{-3}$ NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

Accordingly, it is a feature of the present invention to provide an open-cell foam having a controllable level of open cells. It is a further feature of the invention to provide a method of making such an open-cell foam. Additional applications for the open cell foams of the present invention include vacuum insulation, filtration and fluid absorption applications. These, and other features and advantages of the present invention will become apparent from the following detailed description and the appended claims.

DETAILED DESCRIPTION OF THE PREFERRED EMBODIMENTS

The addition of a substantially random interpolymer, preferably a substantially random ethylene-styrene interpolymer, to alkenyl aromatic polymer foams, preferably polystyrene foams unexpectedly results in a foam having controllable cell openings without adversely affecting foam quality. While not wishing to be bound to a particular theory, it is believed that the substantially random interpolymer, which is compatible with, but not miscible with the alkenyl aromatic polymer, acts as a cell opener by forming a multitude of domains in the alkenyl aromatic polymer phase of the blend. The substantially random interpolymer droplets, which have a low solidification temperature, remain fluid even near the end of foam expansion, thus providing the cell opening initiation points.

In the preferred embodiment of the present invention of an open cell alkenyl aromatic polymer foam, we have found that the amount of open cell content increases as the level of substantially random ethylene-styrene interpolymer interpolymer is increased, thus allowing the level of open cells to be controlled for the desired application. For a substantially random ethylene-styrene interpolymer foam we have found that the amount of open cell content increases as the level of alkenyl aromatic polymer is increased, thus allowing the level of open cells to be controlled for the desired application. For example, a partially open-cell foam (for example 20–50 percent open cells) is particularly suitable for applications requiring faster aging and greater foam dimensional stability, whereas fully open-cell foam (for example 80 percent or more open cells) may be used in sound absorption, fluid absorption, and filtering applications.

We have also found that the addition of the substantially random interpolymer allows a wider foaming temperature window. In past production of open-cell foams, it has been necessary to increase the foaming temperature by about 5 to 10° C. over temperatures normally used in producing closed-cell foams in order to encourage cell opening. However, such an increase in temperature often degrades the quality of the foam as excessively high foaming temperatures can cause foam collapse due to rapid loss of blowing agent and reduced ability of cell struts to resist ambient pressure. Further, high foaming temperatures can reduce extrusion die pressures to unacceptable low levels and negatively impact skin quality, resulting in a very narrow foaming temperature window within which good quality foams can be produced. By using the substantially random interpolymers and preferably the substantially random ethylenestyrene interpolymers, the foams of the present invention can be processed using the same temperature conditions as those used in the past for production of a closed-cell foam, resulting in a wider foaming temperature window.

Preferred foaming temperatures will vary from about between about 110° C. to about 135° C., wherein the foaming temperature is from about 3° C. to about 15° C. lower than the highest foaming temperature for a corresponding closed cell foam. It should be appreciated that desirable foaming temperatures will vary depending upon factors including the polymer material characteristics, blowing agent composition and concentration, and the configuration of the extrusion system.

We have also found that addition of the substantially random ethylene-styrene interpolymer can be tailored to yield high open cell content, small cell size foams for applications requiring this combination, or high open cell content, large cell size foams for applications requiring this combination.

The interpolymers used to prepare the foams of the present invention include the substantially random interpolymers prepared by polymerizing i) ethylene and/or one or more α-olefin monomers and ii) one or more vinyl or vinylidene aromatic monomers and/or one or more sterically hindered aliphatic or cycloaliphatic vinyl or vinylidene monomers, and optionally iii) other polymerizable ethylenically unsaturated monomer(s). Suitable α-olefins include for example, α-olefins containing from 3 to about 20, preferably from 3 to about 12, more preferably from 3 to about 8 carbon atoms. Particularly suitable are ethylene, propylene, butene-1,4-methyl-1-pentene, hexene-1 or octene-1 or ethylene in combination with one or more of propylene, butene-1,4-methyl-1-pentene, hexene-1 or octene-1. These α-olefins do not contain an aromatic moiety.

Other optional polymerizable ethylenically unsaturated monomer(s) include norbornene and $C_{1-10}$ alkyl or $C_{6-10}$ aryl substituted norbornenes, with an exemplary interpolymer being ethylene/styrene/norbornene.

Suitable vinyl or vinylidene aromatic monomers which can be employed to prepare the interpolymers include, for example, those represented by the following formula:

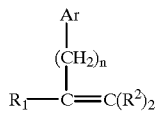

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to about 4, preferably from zero to 2, most preferably zero. Exemplary vinyl aromatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof. Preferred monomers include styrene, α-methyl styrene, the lower alkyl-($C_1$–$C_4$) or phenyl-ring substituted derivatives of styrene, such as for example, ortho-, meta-, and para-methylstyrene, the ring halogenated styrenes, para-vinyl toluene or mixtures thereof, and the like. A more preferred aromatic vinyl monomer is styrene.

By the term "sterically hindered aliphatic or cycloaliphatic vinyl or vinylidene compounds", it is meant addition polymerizable vinyl or vinylidene monomers corresponding to the formula:

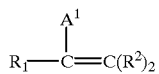

wherein $A_1$ is a sterically bulky, aliphatic or cycloaliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and $A_1$ together form a ring system. Preferred aliphatic or cycloaliphatic vinyl or vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred aliphatic or cycloaliphatic vinyl or vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene. Simple linear non-branched α-olefins including for example, α-olefins containing from 3 to about 20 carbon atoms such as propylene, butene-1,4-methyl-1-pentene, hexene-1 or octene-1 are not examples of sterically hindered aliphatic or cycloaliphatic vinyl or vinylidene compounds.

One method of preparation of the substantially random interpolymers includes polymerizing a mixture of polymerizable monomers in the presence of one or more metallocene or constrained geometry catalysts in combination with various cocatalysts, as described in EP-A-0,416,815 by James C. Stevens et al. and U.S. Pat. No. 5,703,187 by Francis J. Timmers, both of which are incorporated herein by reference in their entirety. Preferred operating conditions for such polymerization reactions are pressures from atmospheric up to 3000 atmospheres and temperatures from −30° C. to 200° C. Polymerizations and unreacted monomer removal at temperatures above the autopolymerization temperature of the respective monomers may result in formation of some amounts of homopolymer polymerization products resulting from free radical polymerization.

Examples of suitable catalysts and methods for preparing the substantially random interpolymers are disclosed in U.S. application Ser. No. 702,475, filed May 20, 1991 (EP-A-514,828); as well as U.S. Pat. No. 5,055,438; 5,057,475; 5,096,867; 5,064,802; 5,132,380; 5,189,192; 5,321,106; 5,347,024; 5,350,723; 5,374,696; 5,399,635; 5,470,993; 5,703,187; and 5,721,185 all of which patents and applications are incorporated herein by reference.

The substantially random α-olefin/vinyl aromatic interpolymers can also be prepared by the methods described in JP 07/278230 employing compounds shown by the general formula

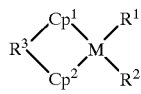

where $Cp^1$ and $Cp^2$ are cyclopentadienyl groups, indenyl groups, fluorenyl groups, or substituents of these, independently of each other; $R^1$ and $R^2$ are hydrogen atoms, halogen atoms, hydrocarbon groups with carbon numbers of 1–12, alkoxyl groups, or aryloxyl groups, independently of each other; M is a group IV metal, preferably Zr or Hf, most preferably Zr; and $R^3$ is an alkylene group or silanediyl group used to cross-link $Cp^1$ and $Cp^2$).

The substantially random α-olefin/vinyl aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in Plastics Technology, p. 25 (September 1992), all of which are incorporated herein by reference in their entirety.

Also suitable are the substantially random interpolymers which comprise at least one α-olefin/vinyl aromatic/vinyl aromatic/α-olefin tetrad disclosed in U.S. application Ser. No. 08/708,869 filed Sep. 4, 1996 and WO 98/09999 both by Francis J. Timmers et al. These interpolymers contain additional signals in their carbon-13 NMR spectra with intensities greater than three times the peak to peak noise. These signals appear in the chemical shift range 43.70–44.25 ppm and 38.0–38.5 ppm. Specifically, major peaks are observed at 44.1, 43.9, and 38.2 ppm. A proton test NMR experiment indicates that the signals in the chemical shift region 43.70–44.25 ppm are methine carbons and the signals in the region 38.0–38.5 ppm are methylene carbons.

It is believed that these new signals are due to sequences involving two head-to-tail vinyl aromatic monomer insertions preceded and followed by at least one α-olefin insertion, for example an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/vinyl aromatic monomer/ethylene tetrad will give rise to similar carbon-13 NMR peaks but with slightly different chemical shifts.

These interpolymers can be prepared by conducting the polymerization at temperatures of from about −30° C. to about 250° C. in the presence of such catalysts as those represented by the formula

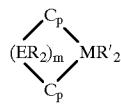

wherein: each Cp is independently, each occurrence, a substituted cyclopentadienyl group π-bound to M; E is C or Si; M is a group IV metal, preferably Zr or Hf, most preferably Zr; each R is independently, each occurrence, H, hydrocarbyl, silahydrocarbyl, or hydrocarbylsilyl, containing up to about 30 preferably from 1 to about 20 more preferably from 1 to about 10 carbon or silicon atoms; each R' is independently, each occurrence, H, halo, hydrocarbyl, hydrocarbyloxy, silahydrocarbyl, hydrocarbylsilyl containing up to about 30 preferably from 1 to about 20 more preferably from 1 to about 10 carbon or silicon atoms or two R' groups together can be a $C_{1-10}$ hydrocarbyl substituted 1,3-butadiene; m is 1 or 2; and optionally, but preferably in the presence of an activating cocatalyst. Particularly, suitable substituted cyclopentadienyl groups include those illustrated by the formula:

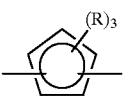

wherein each R is independently, each occurrence, H, hydrocarbyl, silahydrocarbyl, or hydrocarbylsilyl, containing up to about 30 preferably from 1 to about 20 more preferably from 1 to about 10 carbon or silicon atoms or two R groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanediyl)-bis-(2-methyl-4-phenylindenyl) zirconium dichloride, racemic-(dimethylsilanediyl)-bis-(2-methyl-4-phenylindenyl) zirconium 1,4-diphenyl-1,3-butadiene, racemic-(dimethylsilanediyl)-bis-(2-methyl-4-phenylindenyl) zirconium di-C1-4 alkyl, racemic-(dimethylsilanediyl)-bis-(2-methyl-4-phenylindenyl) zirconium di-C1-4 alkoxide, or any combination thereof and the like.

It is also possible to use the following titanium-based constrained geometry catalysts, [N-(1,1-dimethylethyl)-1,1-dimethyl-1-[(1,2,3,4,5-η)-1,5,6,7-tetrahydro-s-indacen-1-yl]silanaminato(2-)-N]titanium dimethyl; (1-indenyl)(tert-butylamido)dimethyl-silane titanium dimethyl; ((3-tert-butyl)(1,2,3,4,5-η)-1-indenyl)(tert-butylamido) dimethylsilane titanium dimethyl; and ((3-iso-propyl)(1,2,3, 4,5-η)-1-indenyl)(tert-butyl amido)dimethylsilane titanium dimethyl, or any combination thereof and the like.

Further preparative methods for the interpolymers used in the present invention have been described in the literature. Longo and Grassi (Makromol. Chem., Volume 191, pages 2387 to 2396[1990]) and D'Anniello et al. (Journal of Applied Polymer Science, Volume 58, pages 1701–1706 [1995]) reported the use of a catalytic system based on methylalumoxane (MAO) and cyclopentadienyltitanium trichloride ($CpTiCl_3$) to prepare an ethylene-styrene copolymer. Xu and Lin (Polymer Preprints, Am. Chem. Soc., Div. Polym. Chem.) Volume 35, pages 686,687[1994]) have reported copolymerization using a $MgCl_2/TiCl_4/NdCl_3/Al$ $(iBu)_3$ catalyst to give random copolymers of styrene and propylene. Lu et al (Journal of Applied Polymer Science, Volume 53, pages 1453 to 1460[1994]) have described the copolymerization of ethylene and styrene using a $TiCl_4/NdCl_3/MgCl_2/Al(Et)_3$ catalyst. Semetz and Mulhaupt, (Macromol. Chem. Phys., v. 197, pp. 1071–1083, 1997) have described the influence of polymerization conditions on the copolymerization of styrene with ethylene using $Me_2Si$ $(Me_4Cp)(N$-tert-butyl$)TiCl_2$/methylaluminoxane Ziegler-Natta catalysts. Copolymers of ethylene and styrene produced by bridged metallocene catalysts have been described by Arai, Toshiaki and Suzuki (Polymer Preprints, Am. Chem. Soc., Div. Polym. Chem.) Volume 38, pages 349, 350[1997]) and in U.S. Pat. No. 5,652,315, issued to Mitsui Toatsu Chemicals, Inc. The manufacture of α-olefin/vinyl aromatic monomer interpolymers such as propylene/styrene and butene/styrene are described in U.S. Pat. No. 5,244,996, issued to Mitsui Petrochemical Industries Ltd or U.S. Pat. No. 5,652,315 also issued to Mitsui Petrochemical Industries Ltd or as disclosed in DE 197 11 339 A1 to Denki Kagaku Kogyo K K. All the above methods disclosed for preparing the interpolymer component are incorporated herein by reference. Also, although of high isotacticity and therefore not "substantially random", the random copolymers of ethylene and styrene as disclosed in Polymer Preprints Vol 39, No. 1, March 1998 by Toru Aria et al. can also be employed as blend components for the foams of the present invention.

While preparing the substantially random interpolymer, an amount of atactic vinyl aromatic homopolymer may be formed due to homopolymerization of the vinyl aromatic monomer at elevated temperatures. The presence of vinyl aromatic homopolymer is in general not detrimental for the purposes of the present invention and can be tolerated. The vinyl aromatic homopolymer may be separated from the interpolymer, if desired, by extraction techniques such as selective precipitation from solution with a non solvent for either the interpolymer or the vinyl aromatic homopolymer. For the purpose of the present invention it is preferred that no more than 30 weight percent, preferably less than 20 weight percent based on the total weight of the interpolymers of atactic vinyl aromatic homopolymer is present.

The polystyrene and ethylene-styrene interpolymer blend of the present invention may be prepared by any suitable means known in the art such as, but not limited to, dry blending in a pelletized form in the desired proportions followed by melt blending in a screw extruder, Banbury mixer or the like. The dry blended pellets may be directly melt processed into a final solid state article by, for example, injection molding. Alternatively, the blends may be made by direct polymerization, without isolation of the blend components, using for example, two or more catalysts in one reactor, or by using a single catalyst and two or more reactors in series or parallel.

Preparation of the Foams of the Present Invention

In the process of the present invention, a screw-type extruder is preferably used. Such an extruder typically comprises a series of sequential zones including a feed zone, compression and melt zones, a metering zone, and a mixing zone. The barrel of the extruder may be provided with conventional electric heaters for zoned temperature control.

An inlet is provided for adding a blowing agent to the polymer blend in the extruder barrel between the metering and mixing zones. The blowing agent is compounded into the polymer blend to form a flowable gel. The discharge end of the mixing zone of the extruder is connected, through a cooling zone, to a die orifice. The hot polymer gel is cooled and then passed through the die orifice where the blowing agent is activated and the polymer gel expands to form a foam. As the foamed extrusion forms, it is conducted away from the die and allowed to cool and harden.

In practice, the temperatures of the extruder zones are maintained at temperatures of between about 160° C. to 230° C., and the temperature in the cooling zone is maintained at a temperature of between about 110° C. and 135° C.

The compositions of the present invention may be used to form extruded thermoplastic polymer foam, expandable thermoplastic foam beads or expanded thermoplastic foams, and molded articles formed by expansion and/or coalescing and welding of those particles.

The foams may take any known physical configuration, such as extruded sheet, rod, plank, films and profiles. The foam structure also may be formed by molding expandable beads into any of the foregoing configurations or any other configuration.

The foams may, if required for fast cure purposes and to attain accelerated blowing agent release, be modified by introducing a multiplicity of channels or perforations into the foam extending from a surface into the foam, the channels being free of direction with respect to the longitudinal extension of the foam. Excellent teachings of such modifications are disclosed in U.S. Pat. No. 5,424,016, WO 92/19439 and WO 97/22455, the entire contents of which are herein incorporated by reference.

Foam structures may be made by a conventional extrusion foaming process. The present foam is generally prepared by melt blending in which the alkenyl aromatic polymer material and one or more substantially random interpolymers are heated together to form a plasticized or melt polymer material, incorporating therein a blowing agent to form a foamable gel, and extruding the gel through a die to form the foam product. Prior to extruding from the die, the gel is cooled to an optimum temperature. To make a foam, the optimum temperature is at or above the blends glass transition temperature or melting point. For the foams of the present invention the optimum foaming temperature is in a range in which the foam does not collapse. The blowing agent may be incorporated or mixed into the melt polymer material by any means known in the art such as with an extruder, mixer, blender, or the like. The blowing agent is mixed with the melt polymer material at an elevated pressure sufficient to prevent substantial expansion of the melt polymer material and to generally disperse the blowing agent homogeneously therein. Optionally, a nucleator may be blended in the polymer melt or dry blended with the polymer material prior to plasticizing or melting. The substantially random interpolymers may be dry-blended with the polymer material prior to charging to the extruder, or charged to the extruder in the form of a polymer concentrate or a interpolymer/color pigment carrier material. The foamable gel is typically cooled to a lower temperature to optimize physical characteristics of the foam structure. The gel may be cooled in the extruder or other mixing device or in separate coolers. The gel is then extruded or conveyed through a die of desired shape to a zone of reduced or lower pressure to form the foam structure. The zone of lower pressure is at a pressure lower than that in which the formable gel is maintained prior to extrusion through the die. The lower pressure may be superatmospheric or subatmospheric (vacuum), but is preferably at an atmospheric level.

The present foam structures may be formed in a coalesced strand form by extrusion of the compositions of the present invention through a multi-orifice die. The orifices are arranged so that contact between adjacent streams of the molten extrudate occurs during the foaming process and the contacting surfaces adhere to one another with sufficient adhesion to result in a unitary foam structure. The streams of molten extrudate exiting the die take the form of strands or profiles, which desirably foam, coalesce, and adhere to one another to form a unitary structure. Desirably, the coalesced individual strands or profiles should remain adhered in a unitary structure to prevent strand delamination under stresses encountered in preparing, shaping, and using the foam. Apparatuses and method for producing foam structures in coalesced strand form are seen in U.S. Pat. Nos. 3,573,152 and 4,824,720, both of which are incorporated herein by reference.

The present foam structures may also be formed by an accumulating extrusion process as seen in U.S. Pat. No. 4,323,528, which is incorporated by reference herein. In this process, low density foam structures having large lateral cross-sectional areas are prepared by: 1) forming under pressure a gel of the compositions of the present invention and a blowing agent at a temperature at which the viscosity of the gel is sufficient to retain the blowing agent when the gel is allowed to expand; 2) extruding the gel into a holding zone maintained at a temperature and pressure which does not allow the gel to foam, the holding zone having an outlet die defining an orifice opening into a zone of lower pressure at which the gel foams, and an openable gate closing the die orifice; 3) periodically opening the gate; 4) substantially concurrently applying mechanical pressure by a movable ram on the gel to eject it from the holding zone through the die orifice into the zone of lower pressure, at a rate greater than that at which substantial foaming in the die orifice occurs and less than that at which substantial irregularities in cross-sectional area or shape occurs; and 5) permitting the ejected gel to expand unrestrained in at least one dimension to produce the foam structure.

The present foam structures may also be used to make foamed films for bottle labels and other containers using either a blown film or a cast film extrusion process. The films may also be made by a co-extrusion process to obtain foam in the core with one or two surface layers, which may or may not be comprised of the polymer compositions used in the present invention.

Blowing agents useful in making the present foams include inorganic blowing agents, organic blowing agents and chemical blowing agents. Suitable inorganic blowing agents include nitrogen, sulfur hexafluoride ($SF_6$), argon, water, air and helium. Organic blowing agents include carbon dioxide, aliphatic hydrocarbons having 1–9 carbon atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, isobutane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride,), 1,1-difluoroethane (HFC-152a), fluoroethane (HFC-161), 1,1,1-trifluoroethane (HFC-143a), 1,1,1,2-tetrafluoroethane (HFC-134a), 1,1,2,2 tetrafluoroethane (HFC-134), 1,1,1,3,3-pentafluoropropane, pentafluoroethane (HFC-125), difluoromethane (HFC-32), perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloro-ethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichloro-trifluoroethane (CFC-113), dichlorotetrafluoroethane (CFC-114), chloroheptafluoropropane, and dichlorohexafluoropropane. Chemical blowing agents include azodicarbonamide, azodiisobutyro-nitrile, benzenesulfonhydrazide, 4,4-oxybenzene sulfonylsemicarbazide, p-toluene sulfonyl semi-carbazide, barium azodicarboxylate, N,N'-dimethyl-N,N'-dinitroso-terephthalamide, trihydrazino triazine and mixtures of citric acid and sodium bicarbonate such as the various products sold under the name Hydrocerol™ (a product and trademark of Boehringer Ingeltheim). All of these blowing agents may be used as single components or any mixture of combination thereof, or in mixtures with other co-blowing agents.

The blowing agent used in the present invention must be capable of ensuring formation of a foam with the desired cell size and open cell content. Preferable blowing agents for use in the present invention include 1,1-difluoroethane (HFC-152a), 1,1,1,2-tetrafluoroethane (HFC-134a), carbon dioxide, and water. Carbon dioxide is the preferred blowing agent, and may be used either alone or in combination with the other blowing agents or with mixtures thereof.

The amount of blowing agent incorporated into the polymer melt material to make a foam-forming polymer gel is from about 0.5 to about 5.0 gram-moles per kilogram of polymer, preferably from about 0.2 to about 4.0 gram-moles per kilogram of polymer, and most preferably from about 0.5 to 3.0 gram-moles per kilogram of polymer. The use of a relatively small amount of blowing agent allows formation of a foam with a high open cell content.

In addition, a nucleating agent may be added in order to control the size of foam cells. Preferred nucleating agents include inorganic substances such as calcium carbonate, talc, clay, silica, barium stearate, calcium stearate, diatomaceous earth, mixtures of citric acid and sodium bicarbonate, and the like. The amount of nucleating agent employed may range from 0 to about 5 parts by weight per hundred parts by weight of a polymer resin. The preferred range is from 0 to about 3 parts by weight.

Various additives may be incorporated in the present foam structure such as inorganic fillers, pigments, colorants, antioxidants, acid scavengers, ultraviolet absorbers, flame retardants, processing aids, extrusion aids, permeability modifiers, antistatic agents, other thermoplastic polymers and the like. Examples of permeability modifiers include but are not limited to glycerol monoesters. These monoesters may also serve to reduce static during foam manufacture. Examples of other thermoplastic polymers include alkenyl aromatic homopolymers or copolymers (having molecular weight of about 2,000 to about 50,000) and ethylenic polymers.

Properties of the Interpolymers and Blend Compositions Used to Prepare the Foams of the Present Invention.

The polymer compositions used to prepare the foams of the present invention comprise from about 30 to about 99.5, preferably from about 50 to about 99.5, more preferably from about 80 to about 99.5 wt percent, (based on the combined weights of substantially random interpolymer and the alkenyl aromatic homopolymers or copolymer) of one or more alkenyl aromatic homopolymers or copolymers.

The molecular weight distribution ($M_w/M_n$) of the alkenyl aromatic homopolymers or copolymers used to prepare the foams of the present invention is from about 2 to about 7.

The molecular weight (Mw) of the alkenyl aromatic homopolymers or copolymers used to prepare the foams of the present invention is from about 100,000 to about 500,000, preferably of from about 120,000 to about 350,000, more preferably 130,000 to 325,000.

The alkenyl aromatic polymer material used to prepare the foams of the present invention comprises greater than 50 and preferably greater than 70 weight percent alkenyl aromatic monomeric units. Most preferably, the alkenyl aromatic polymer material is comprised entirely of alkenyl aromatic monomeric units.

The polymer compositions used to prepare the foams of the present invention comprise from about 0.5 to about 70, preferably from about 0.5 to about 50, more preferably from about 0.5 to about 20 wt percent, (based on the combined weights of substantially random interpolymer and the alkenyl aromatic homopolymers or copolymers) of one or more substantially random interpolymers.

These substantially random interpolymers used to prepare the foams of the present invention usually contain from about 0.5 to about 65, preferably from about 15 to about 50, more preferably from about 30 to about 50 mole percent of at least one vinyl or vinylidene aromatic monomer and/or aliphatic or cycloaliphatic vinyl or vinylidene monomer and from about 35 to about 99.5, preferably from about 50 to about 85, more preferably from about preferably from about 50 to about 70 mole percent of ethylene and/or at least one aliphatic α-olefin having from about 3 to about carbon atoms.

The melt index ($I_2$) of the substantially random interpolymer used to prepare the foams of the present invention is from about 0.1 to about 50, preferably of from about 0.3 to about 30, more preferably of from about 0.5 to about 10 g/10 min.

The molecular weight distribution ($M_w/M_n$) of the substantially random interpolymer used to prepare the foams of the present invention is from about 1.5 to about 20, preferably of from about 1.8 to about 10, more preferably of from about 2 to about 5.

In addition, minor amounts of alkenyl aromatic homopolymers or copolymers having a molecular weight of about 2,000 to about 50,000, preferably from about 4,000 to about 25,000 can be added in an amount not exceeding about 20 wt percent (based on the combined weights of substantially random interpolymer and the various alkenyl aromatic homopolymers or copolymers).

Parameters of the Process Used to Prepare the Foams of the Present Invention.

The process for making the open-cell foam of the present invention comprises the steps of blending together the alkenyl aromatic polymer, preferably polystyrene; and the substantially random interpolymer, preferably a substantially random ethylene-styrene interpolymer and adding a blowing agent to the blend to form a gel. The gel is then extruded through a die to form the foam. The temperature at which the foam is formed (foaming temperature) is between about 110° C. and 135° C., preferably between 115 and 135, more preferably between 120 and 135° C., and is from 3 to 15° C. lower than the highest foaming temperature for a corresponding closed-cell foam.

Properties of the Foams of the Present Invention.

The foam has a density of from about 10 to about 200, preferably from about 15 to about 100 and most preferably from about 20 to about 60 kilograms per cubic meter according to ASTM D-1622-88.

The foam has an average cell size of from about 5 to about 2,000, preferably from about 20 to about 1,000, and more preferably about 50 to about 500 microns according to ASTM D3576-77.

The foam has a water absorption value of from about 5 to about 25 g/g foam.

The open-cell foam contains at least 20 percent open cells. More preferably, the foam contains at least 50 percent open cells, and most preferably, at least 80 percent open cells as measured according to ASTM D 2856-A.

The foams may be produced in the form of beads, plank, round, sheets and is particularly suited to be formed into a plank or sheet, desirably one having a thickness or minor dimension in cross-section of 1 mm or more, preferably 2 mm or more, or more preferably 2.5 mm or more. The foam width could be as large as about 1.5 meter.

Foams produced in accordance with the present invention can be used in a number of applications including fluid absorption and sound absorption applications. The foams of the present invention may be used in a variety of other applications such as cushion packaging, athletic and recreational products, egg cartons, meat trays, building and construction (for example, thermal insulation, acoustical insulation), pipe insulation, gaskets, vibration pads, luggage liners, desk pads shoe soles, gymnastic mats, insulation blankets for greenhouses, case inserts, display foams, etc. Examples of building and construction applications include external wall sheathing (home thermal insulation), roofing, foundation insulation, and residing underlayment. Other applications include insulation for refrigeration, buoyancy applications (for example, body boards, floating docks and rafts) as well as various floral and craft applications. It should be clear, however, that the foams of this invention will not be limited to the above mentioned applications.

The following examples are illustrative of the invention, but are not to be construed as to limiting the scope thereof in any manner.

EXAMPLES

Test Methods a) Melt Flow and Density Measurements

The molecular weight of the substantially random interpolymers used in the present invention is conveniently indicated using a melt index measurement according to ASTM D-1238, Condition 190° C./2.16 kg (formally known as "Condition (E)" and also known as $I_2$) was determined. Melt index is inversely proportional to the molecular weight of the polymer. Thus, the higher the molecular weight, the lower the melt index, although the relationship is not linear.

Also useful for indicating the molecular weight of the substantially random interpolymers used in the present invention is the Gottfert melt index (G, cm$^3$/10 min) which is obtained in a similar fashion as for melt index ($I_2$) using the ASTM D1238 procedure for automated plastometers, with the melt density set to 0.7632, the melt density of polyethylene at 190° C.

The relationship of melt density to styrene content for ethylene-styrene interpolymers was measured, as a function of total styrene content, at 190° C. for a range of 29.8 percent to 81.8 percent by weight styrene. Atactic polystyrene levels in these samples was typically 10 percent or less. The influence of the atactic polystyrene was assumed to be minimal because of the low levels. Also, the melt density of atactic polystyrene and the melt densities of the samples with high total styrene are very similar. The method used to determine the melt density employed a Gottfert melt index machine with a melt density parameter set to 0.7632, and the collection of melt strands as a function of time while the $I_2$ weight was in force. The weight and time for each melt strand was recorded and normalized to yield the mass in grams per 10 minutes. The instrument's calculated $I_2$ melt index value was also recorded. The equation used to calculate the actual melt density is $$d = d_{0.7632} \times I_2 / I_2 \text{Gottfert}$$

where $d_{0.7632}=0.7632$ and $I_2$ Gottfert=displayed melt index.

A linear least squares fit of calculated melt density versus total styrene content leads to an equation with a correlation coefficient of 0.91 for the following equation:

$$\delta = 0.00299 \times S + 0.723$$

where S=weight percentage of styrene in the polymer. The relationship of total styrene to melt density can be used to determine an actual melt index value, using these equations if the styrene content is known.

So for a polymer that is 73 percent total styrene content with a measured melt flow (the "Gottfert number"), the calculation becomes:

$x=0.00299*73+0.723 \ 0.9412$ where $0.9412/0.7632=I_2/G\#(measured)=1.23$ b) Styrene Analyses Interpolymer styrene content and atactic polystyrene concentration were determined using proton nuclear magnetic resonance ($^1$H N.M.R). All proton NMR samples were prepared in 1,1,2,2-tetrachloroethane-d$_2$ (TCE-d$_2$). The resulting solutions were 1.6–3.2 percent polymer by weight. Melt index (I$_2$) was used as a guide for determining sample concentration. Thus when the I$_2$ was greater than 2 g/10 min, 40 mg of interpolymer was used; with an I$_2$ between 1.5 and 2 g/10 min, 30 mg of interpolymer was used; and when the I$_2$ was less than 1.5 g/10 min, 20 mg of interpolymer was used. The interpolymers were weighed directly into 5 mm sample tubes. A 0.75 mL aliquot of TCE-d$_2$ was added by syringe and the tube was capped with a tight-fitting polyethylene cap. The samples were heated in a water bath at 85° C. to soften the interpolymer. To provide mixing, the capped samples were occasionally brought to reflux using a heat gun.

Proton NMR spectra were accumulated on a Varian VXR 300 with the sample probe at 80° C., and referenced to the residual protons of TCE-d$_2$ at 5.99 ppm. The delay times were varied between 1 second, and data was collected in triplicate on each sample. The following instrumental conditions were used for analysis of the interpolymer samples:

Varian VXR-300, standard $^1$H:
 Sweep Width, 5000 Hz
 Acquisition Time, 3.002 sec
 Pulse Width, 8 μsec
 Frequency, 300 MHz
 Delay, 1 sec
 Transients, 16

The total analysis time per sample was about 10 minutes.

Initially, a $^1$H NMR spectrum for a sample of the polystyrene, having a molecular weight (Mw) of about 192,000, was acquired with a delay time of one second. The protons were "labeled": b, branch; a, alpha; o, ortho; m, meta; p, para, as shown in FIG. 1.

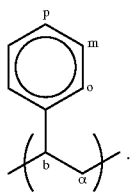

FIG. 1

Integrals were measured around the protons labeled in FIG. 1. the 'A' designates aPS. Integral A$_{7.1}$ (aromatic, around 7.1 ppm) is believed to be the three ortho/para protons; and integral A$_{6.6}$ (aromatic, around 6.6 ppm) the two meta protons. The two aliphatic protons labeled a resonate at 1.5 ppm; and the single proton labeled b is at 1.9 ppm. The aliphatic region was integrated from about 0.8 to 2.5 ppm and is referred to as A$_{al}$. The theoretical ratio for A$_{7.1}$:A$_{6.6}$:A$_{al}$ is 3: 2: 3, or 1.5: 1: 1.5, and correlated very well with the observed ratios for the polystyrene sample for several delay times of 1 second. The ratio calculations used to check the integration and verify peak assignments were performed by dividing the appropriate integral by the integral A$_{6.6}$ Ratio A$_r$ is A$_{7.1}$/A$_{6.6}$.

Region A$_{6.6}$ was assigned the value of 1. Ratio Al is integral A$_{al}$/A$_{6.6}$. All spectra collected have the expected 1.5: 1: 1.5 integration ratio of (o+p): m: (α+b). The ratio of aromatic to aliphatic protons is 5 to 3. An aliphatic ratio of 2 to 1 is predicted based on the protons labeled a and b respectively in FIG. 1. This ratio was also observed when the two aliphatic peaks were integrated separately.

For the ethylene/styrene interpolymers, the $^1$H NMR spectra using a delay time of one second, had integrals C$_{7.1}$, C$_{6.6}$, and C$_{al}$ defined, such that the integration of the peak at 7.1 ppm included all the aromatic protons of the copolymer as well as the o & p protons of aPS. Likewise, integration of the aliphatic region C$_{al}$ in the spectrum of the interpolymers included aliphatic protons from both the aPS and the interpolymer with no clear baseline resolved signal from either polymer. The integral of the peak at 6.6 ppm C$_{6.6}$ is resolved from the other aromatic signals and it is believed to be due solely to the aPS homopolymer (probably the meta protons). (The peak assignment for atactic polystyrene at 6.6 ppm (integral A$_{6.6}$) was made based upon comparison to the authentic sample of polystyrene having a molecular weight (Mw) of about 192,000, This is a reasonable assumption since, at very low levels of atactic polystyrene, only a very weak signal is observed here. Therefore, the phenyl protons of the copolymer must not contribute to this signal. With this assumption, integral A$_{6.6}$ becomes the basis for quantitatively determining the aPS content.

The following equations were then used to determine the degree of styrene incorporation in the ethylene/styrene interpolymer samples:

(C Phenyl)=$C_{7.1}+A_{7.1}-(1.5 \times A_{6.6})$ (C Aliphatic)=$C_{al}-(15 \times A_{6.6})$ $s_c$=(C Phenyl)/5

$e_c$=(C Aliphatic$-(3 \times s_c))/4$ $E=e_c/(e_c+s_c)$ $S_c=s_c/(e_c+s_c)$ and the following equations were used to calculate the mol percent ethylene and styrene in the interpolymers.

$$\mathrm{Wt}\% E = \frac{E*28}{(E*28)+(S_c*104)}(100)$$

and $$\mathrm{Wt}\% S = \frac{S_c*104}{(E*28)+(S_c*104)}(100)$$

where: $s_c$ and $e_c$ are styrene and ethylene proton fractions in the interpolymer, respectively, and $S_c$ and E are mole fractions of styrene monomer and ethylene monomer in the interpolymer, respectively.

The weight percent of aPS in the interpolymers was then determined by the following equation:

$$\mathrm{Wt}\% \, aPS = \frac{(\mathrm{Wt}\%S)*\left(\frac{A_{6.6}/2}{s_c}\right)}{100+\left[(\mathrm{Wt}\%S)*\left(\frac{A_{6.6}/2}{s_c}\right)\right]}*100$$

The total styrene content was also determined by quantitative Fourier Transform Infrared spectroscopy (FTIR).

Experimental Procedure for Open Cell Content

The open cell test was based on a liquid intrusion technique. The volume (V) and dry weight (DW) for each foam sample was recorded. The foam samples were placed on the bottom of a desiccator, below the desiccator plate. Plastic tubing was used to connect the desiccator to a filter flask used as a liquid reservoir. Another filter flask used as a liquid trap was placed between the liquid reservoir and a vacuum pump which was used to create the pressure gradient across the system.

The liquid used in this test was water with 0.75 percent of a common dish soap (active ingredient—water soluble surfactant that is sodium laurel sulfate). The reduced surface tension of this liquid ensures wetting of the polymer surface.

The pump was set to the desired vacuum (>600 torr) and the system pressure was allowed to stabilize (approximately 10 minutes). Once stable, the plastic tube from the liquid reservoir to the desiccator was inserted into the liquid. The vacuum pump was then turned off, introducing atmospheric pressure to the system and forcing the liquid from the liquid reservoir into the desiccator. Note: There must be enough liquid in the reservoir to cover the desiccator plate. After about 15 minutes, the sample was removed from the liquid and blotted with a paper towel to remove any excess water on the surface. The sample was weighed to determine the amount of liquid absorbed and the wet weight (WW) was recorded. The open cell content (in percent open cell) was then calculated from the following formula Open Cell percentage=100*(WW−DW)/(V−DW/d)

where d is the density of the polymer in $g/cm^3$.

Experimental Procedure for Atmospheric Liquid Absorbence

In this test the dry weight of the foam sample was recorded. The sample was then placed in a low surface tension liquid soap solution (surface tension<40 dynes/cm). The sample was allowed to sit in the solution for 24 hours. After 24 hours, the sample was removed from the liquid and blotted with a paper towel to remove any excess water on the surface. The sample was weighed to determine the amount of liquid absorbed. The results are reported in terms of grams of liquid absorbed per gram of foam.

Preparation of Substantially Random Ethylene/Styrene Interpolymers (ESI's) 1–3.

Polymerization experiments were performed using a 1 gallon stirred Autoclave Engineers reactor. The reactor was charged with the desired amounts of cyclohexane solvent and styrene using a mass flow meter. Hydrogen was added by expansion from a 75 mL vessel and measured as a pressure drop on this vessel (delta psig), then the reactor was heated to the polymerization temperature of 60° C. and saturated with ethylene to the desired pressure. The catalyst was prepared in an inert atmosphere glovebox by successively adding hydrocarbon solutions of the catalyst (titanium (N- 1,1-dimethylethyl)dimethyl(1-(1,2,3,4,5-η)-2,3,4,5-tetramethyl-2,4-cyclopentadien-1-yl)silanaminato))(2-)N)-dimethyl, CAS# 135072-62-7), and the cocatalyst tris (pentafluorophenyl)-borane, (CAS# 001109-15-5),. and a modified methylaluminoxane commercially available from Akzo Nobel as MMAO-3A (CAS# 146905-79-5) to enough additional solvent to give a total volume of 20 mL. The TI:B:Al molar ratio was 1:1.5:20. The catalyst solution was then transferred by syringe to a catalyst addition loop and injected into the reactor over approximately 20 minutes using a flow of high pressure solvent. The polymerization was allowed to proceed for approximately 30 minutes while feeding ethylene on demand to maintain the desired pressure. The amount of ethylene consumed during the reaction was monitored using a mass flow meter. The polymer solution was dumped from the reactor into a nitrogen-purged glass kettle. The polymer solution was dumped into a tray, isolated in methanol, filtered, and then thoroughly dried in a vacuum oven. The average process conditions for these samples are summarized in Table 1 and the polymer properties are summarized in Table 3.

TABLE 1

| ESI # | Pressure psig (kPa) | Styrene (g) | Solvent (g) | Hydrogen delta psig (kPa) |
|---|---|---|---|---|
| ESI-1 | 70 (482) | 1215 | 702 | 23.4 (161.2) |
| ESI-2 | 38 (262) | 1673 | 342 | 16.4 (113.0) |
| ESI-3 | 15 (103) | 2020 | 0 | 7.0 (48.2) |

Preparation of ESI 4

The ESI 4 interpolymer was prepared in a 400 gallon (1514 L) agitated semi-continuous batch reactor. The reaction mixture consisted of approximately 250 gallons (946 L) of solvent comprising a mixture of cyclohexane (85 wt percent) and isopentane (15 wt percent), and styrene. Prior to addition, solvent, styrene and ethylene were purified to remove water and oxygen. The inhibitor in the styrene was also removed. Inerts were removed by purging the vessel with ethylene. The vessel was then pressure controlled to a set point with ethylene. Hydrogen was added to control molecular weight. Temperature in the vessel was controlled to set-point by varying the jacket water temperature on the vessel. Prior to polymerization, the vessel was heated to the desired run temperature and the catalyst components Titanium: (N-1,1-dimethylethyl)dimethyl(1-(1,2,3,4,5-eta)-2,3, 4,5-tetramethyl-2,4-cyclopentadien-1-yl)silanaminato))(2-) N)-dimethyl, CAS# 135072-62-7 and Tris (pentafluorophenyl)boron, CAS# 001109-15-5, Modified methylaluminoxane Type 3A, CAS# 146905-79-5 were flow controlled, on a mole ratio basis of 1/3/5 respectively , combined and added to the vessel. After starting, the polymerization was allowed to proceed with ethylene supplied to the reactor as required to maintain vessel pressure. In some cases, hydrogen was added to the headspace of the reactor to maintain a mole ratio with respect to the ethylene concentration. At the end of the run, the catalyst flow was stopped, ethylene was removed from the reactor, about 1000 ppm of Irganox™ 1010 anti-oxidant (trademark of Ciba Geigy Corp.) was then added to the solution and the polymer was isolated from the solution. The resulting polymers were isolated from solution by either stripping with steam in a vessel or by use of a devolatilizing extruder. In the case of the steam stripped material, additional processing was required in extruder like equipment to reduce residual moisture and any unreacted styrene. The specific preparation conditions for the interpolymer are summarized in Table 2 and the properties in Table 3.

TABLE 2

| | Solvent loaded | | Styrene loaded | | Pressure | | Temp | Total H$_2$ Added | Run Time |
|---|---|---|---|---|---|---|---|---|---|
| ESI # | lbs | kg | lbs | kg | Psig | kPa | ° C. | Grams | Hrs |
| ESI4 | 252 | 114 | 1320 | 599 | 40 | 276 | 50 | 23 | 6.5 |

TABLE 3

| Resin Designation | Styrene Content (wt. %) | Styrene Content (mol %) | Melt Index (dg/min)[1] |
|---|---|---|---|
| ESI-1 | 33.7 | 12.0 | 1.13 |
| ESI-2 | 50.7 | 21.7 | 1.10 |
| ESI-3 | 64.8 | 33.1 | 1.23 |
| ESI-4 | 81.6 | 54.4 | 1.83 |

[1]Determined per ASTM D-1238 at 196° C./2 kg

Foams were prepared in accordance with the present invention utilizing ethylene-styrene interpolymer resins which were prepared as described above.

Example 1

A polymer blend was prepared by blending a granular polystyrene resin having a weight average molecular weight of 200,000 with the ESI-3 resin. The level of ESI-3 was varied from 1 to 5 wt percent. The ES interpolymer was made into a 10 wt percent concentrate by pre-blending the resin with the polystyrene resin using a twin-screw extruder.

The mixture was then fed into the hopper of an extruder and extruded at a uniform rate of 4.5 kg/hr. The apparatus used in this Example is a 38 mm (1½") screw type extruder having additional zones of mixing and cooling at the end of usual sequential zones of feeding, metering and mixing. An opening for a blowing agent is provided on the extruder barrel between the metering and mixing zones. A die orifice having a rectangular shaped-opening is included at the end of the cooling zone. The height of the opening, hereinafter referred to as die gap, is adjustable while its width is fixed at 6.35 mm.

The temperatures maintained at the extruder zones were 160° C. at the feeding zone, 190° C. at the transition zone, 193° C. at the melting zone, 204° C. at the metering zone and 106° C. at the mixing zone. Carbon dioxide was injected into the injection point at a uniform rate so that its level became approximately 4.92 parts per one hundred parts of total resin. The temperature of the cooling zone was gradually reduced by lowering the coolant (oil) temperature to cool the polymer/blowing agent mixture (gel) to the optimum foaming temperature. The temperature of the die orifice was maintained at approximately the same temperature as the cooling zone temperature. The gel temperature where a good foam was made ranged from 129–130° C.

The thickness of the resulting foams ranged from 7.1 to 9.1 mm and the width of the foams ranged from 22.5 to 24.7 mm. As shown in Table 4, the foam density decreases slightly as the level of ESI resin is increased. The cell size remains relatively unchanged. As can be seen, the ESI resin has the most pronounced effect on the open cell content. The open cell content was shown to increase as the ESI level is increased. Open-cell contents as high as 88 percent were achieved.

TABLE 4

| Run No. | ES Level (wt %) (1) | Coolant Temp (° C.) (2) | Foam Density (kg/m³) | Cell Size (µm) (3) | Open Cell Content (%) (4) |
|---|---|---|---|---|---|
| 1* | 0 | 133 | 47 | 68 | 3 |
| 2 | 2 | 134 | 45 | 64 | 63 |
| 3 | 3 | 134 | 45 | 62 | 80 |
| 4 | 5 | 134 | 44 | 61 | 88 |

*not an example of this invention (1) Parts of ethylene-styrene interpolymer mixed in per one hundred parts of blend.
(2) Temperature of the cooling oil that circulated the cooling section
(3) Cell size as determined per ASTM D 3576
(4) Open cell content of the foam body as determined per ASTM D 2856-A

Example 2

Foams were produced as in Example 1, but using the ESI-2 resin (Table 1). The thickness of the foams ranged from 5.8 to 7.6 mm and the width of the foams ranged from 24.2 to 26.0 mm. As shown in Table 5, the addition of 1–5 wt percent of the ESI resin resulted in foams having a high open cell content.

TABLE 5

| Run No. | ES Level (wt %) (1) | Coolant Temp. (° C.) (2) | Foam Density (kg/m³) | Cell Size (µm) (3) | Open Cell Content (%) (4) |
|---|---|---|---|---|---|
| 1 | 1 | 133 | 50 | 73 | 70 |
| 2 | 2 | 133 | 42 | 56 | 45 |
| 3 | 5 | 133 | 44 | 67 | 74 |

(1) Parts of ethylene-styrene interpolymer mixed in per one hundred parts of blend.
(2) Temperature of the cooling oil that circulated the cooling section
(3) Cell size as determined per ASTM D 3576
(4) Open cell content of the foam body as determiend per ASTM D 2856-A

Example 3

Foams were produced as in Example 1 using the ESI-1 resin (Table 1). The thickness of the resulting foams ranged from 7.6 to 7.9 mm and the width of the foams ranged from 23.6 to 23.9 mm. As shown in Table 6, the addition of 2–5 wt percent of the ES resin results in foams having a high open cell content.

TABLE 6

| Run No. | ES Level (wt %) (1) | Coolant Temp. (° C.) (2) | Foam Density (kg/m³) | Cell Size (µm) (3) | Open Cell Content (%) (4) |
|---|---|---|---|---|---|
| 1 | 2 | 132 | 51 | 59 | 71 |
| 2 | 5 | 132 | 48 | 68 | 91 |

(1) Parts of ethylene-styrene interpolymer mixed in per one hundred parts of blend
(2) Temperature of the cooling oil that circulated the cooling section
(3) Cell size as determined per ASTM D 3576
(4) Open cell content of the foam body as determined per ASTM D 2856-A

Example 4

Foams were prepared as in Example 1 using a blend of a polystyrene resin having a weight average molecular weight of 130,000 and an ethylene-styrene interpolymer having a styrene content of 81.5 percent (ESI-4 from Table 1). The level of carbon dioxide was fixed at 3.46 pph. As can be seen in Table 7, at approximately the same foaming temperature, the open cell content increases and the foam density decreases as the level of ES copolymer is increased. It can also be seen that the foaming temperature has an effect on the open-cell content (see runs 4 and 5). Even at a significantly reduced foaming temperature of 124° C. (run 5), the foam still exhibits 33 percent open cells.

TABLE 7

| Run No. | ES Level (wt %) (1) | Foaming Gel Temp. (° C.) | Foam Density (kg/m³) | Cell Size (µm) (2) | Open Cell Content (%) (3) |
|---|---|---|---|---|---|
| 1 | 0 | 130 | 42 | 220 | 0 |
| 2 | 2 | 130 | 43 | 320 | 66 |
| 3 | 3 | 129 | 41 | 230 | 73 |
| 4 | 5 | 130 | 40 | 210 | 81 |
| 5 | 5 | 124 | 44 | 280 | 33 |
| 6 | 8 | 123 | 44 | 380 | 50 |

(1) Parts of ethylene-styrene interpolymer mixed in per one hundred parts of blend
(2) Cell size as determined per ASTM D 3576
(3) Open cell content of the foam body as determined per ASTM D 2856-A Examples 5–12
Preparation of ESI #'s 5–8
ESI #'s 5–8 are substantially random ethylene/styrene interpolymers prepared using the following catalyst and polymerization procedures.
Preparation of Catalyst A (dimethyl[N-(1,1-dimethylethyl)-1,1-dimethyl-1-[(1,2,3,4,5-h)-1,5,6,7-tetrahydro-3-phenyl-s-indacen-1-yl]silanaminato(2-)-N]-titanium)
1) Preparation of 3,5,6,7-Tetrahydro-s-Hydrindacen-1 (2H)-one Indan (94.00 g, 0.7954 moles) and 3-chloropropionyl chloride (100.99 g, 0.7954 moles) were stirred in $CH_2Cl_2$ (300 mL) at 0° C. as $AlCl_3$(130.00 g, 0.9750 moles) was added slowly under a nitrogen flow. The mixture was then allowed to stir at room temperature for 2 hours. The volatiles were then removed. The mixture was then cooled to 0° C. and concentrated $H_2SO_4$ (500 mL) slowly added. The forming solid had to be frequently broken up with a spatula as stirring was lost early in this step. The mixture was then left under nitrogen overnight at room temperature. The mixture was then heated until the temperature readings reached 90° C. These conditions were maintained for a 2 hour period of time during which a spatula was periodically used to stir the mixture. After the reaction period crushed ice was placed in the mixture and moved around. The mixture was then transferred to a beaker and washed intermittently with $H_2O$ and diethylether and then the fractions filtered and combined. The mixture was washed with $H_2O$ (2×200 mL). The organic layer was then separated and the volatiles removed. The desired product was then isolated via recrystallization from hexane at 0° C. as pale yellow crystals (22.36 g, 16.3 percent yield).

$^1$H NMR ($CDCl_3$): d2.04–2.19 (m, 2 H), 2.65 (t, $^3J_{HH}$=5.7 Hz, 2 H), 2.84–3.0(m, 4 H), 3.03 (t, $^3J_{HH}$=5.5 Hz, 2 H), 7.26 (s, 1 H), 7.53 (s, 1 H). $^{13}$C NMR ($CDCl_3$): d25.71, 26.01, 32.19, 33.24, 36.93, 118.90, 122.16, 135.88, 144.06, 152.89, 154.36, 206.50. GC-MS: Calculated for $C_{12}H_{12}O$ 172.09, found 172.05.

2) Preparation of 1,2,3,5-Tetrahydro-7-phenyl-s-indacen.

3,5,6,7-Tetrahydro-s-Hydrindacen-1(2H)-one (12.00 g, 0.06967 moles) was stirred in diethyl ether (200 mL) at 0° C. as PhMgBr (0.105 moles, 35.00 mL of 3.0 M solution in diethyl ether) was added slowly. This mixture was then allowed to stir overnight at room temperature. After the reaction period the mixture was quenched by pouring over ice. The mixture was then acidified (pH=1) with HCl and stirred vigorously for 2 hours. The organic layer was then separated and washed with $H_2O$ (2×100 mL) and then dried over $MgSO_4$. Filtration followed by the removal of the volatiles resulted in the isolation of the desired product as a dark oil (14.68 g, 90.3 percent yield).

$^1$H NMR ($CDCl_3$): d2.0–2.2 (m, 2 H), 2.8–3.1 (m, 4 H), 6.54 (s, 1H), 7.2–7.6 (m, 7 H). GC-MS: Calculated for $C_{18}H_{16}$ 232.13, found 232.05.

3) Preparation of 1,2,3,5-Tetrahydro-7-phenyl-s-indacene, dilithium salt.

1,2,3,5-Tetrahydro-7-phenyl-s-indacen (14.68 g, 0.06291 moles) was stirred in hexane (150 mL) as nBuLi (0.080 moles, 40.00 mL of 2.0 M solution in cyclohexane) was slowly added. This mixture was then allowed to stir overnight. After the reaction period the solid was collected via suction filtration as a yellow solid which was washed with hexane, dried under vacuum, and used without further purification or analysis (12.2075 g, 81.1 percent yield).

4) Preparation of Chlorodimethyl(1,5,6,7-tetrahydro-3-phenyl-s-indacen-1-yl)silane.

1,2,3,5-Tetrahydro-7-phenyl-s-indacene, dilithium salt (12.2075 g, 0.05102 moles) in THF (50 mL) was added dropwise to a solution of $Me_2SiCl_2$ (19.5010 g, 0.1511 moles) in THF (100 mL) at 0° C. This mixture was then allowed to stir at room temperature overnight. After the reaction period the volatiles were removed and the residue extracted and filtered using hexane. The removal of the hexane resulted in the isolation of the desired product as a yellow oil (15.1492 g, 91.1 percent yield). $^1$H NMR ($CDCl_3$): d0.33 (s, 3 H), 0.38 (s, 3 H), 2.20 (p, $^3J_{HH}$=7.5 Hz, 2 H), 2.9–3.1 (m, 4 H), 3.84 (s, 1 H), 6.69 (d, $^3J_{HH}$=2.8 Hz, 1 H), 7.3–7.6 (m, 7 H), 7.68 (d, $^3J_{HH}$=7.4 Hz, 2 H). $^{13}$C NMR ($CDCl_3$): d0.24, 0.38, 26.28, 33.05, 33.18, 46.13, 116.42, 119.71, 127.51, 128.33, 128.64, 129.56, 136.51, 141.31, 141.86, 142.17, 142.41, 144.62. GC-MS: Calculated for $C_{20}H_{21}ClSi$ 324.11, found 324.05.

5) Preparation of N-(1,1-Dimethylethyl)-1,1-dimethyl-1-(1,5,6,7-tetrahydro-3-phenyl-s-indacen-1-yl)silanamine.

Chlorodimethyl(1,5,6,7-tetrahydro-3-phenyl-s-indacen-1-yl)silane (10.8277 g, 0.03322 moles) was stirred in hexane (150 mL) as $NEt_3$ (3.5123 g, 0.03471 moles) and t-butylamine (2.6074 g, 0.03565 moles) were added. This mixture was allowed to stir for 24 hours. After the reaction period the mixture was filtered and the volatiles removed resulting in the isolation of the desired product as a thick red-yellow oil (10.6551 g, 88.7 percent yield).

$^1$H NMR ($CDCl_3$): d0.02 (s, 3 H), 0.04 (s, 3 H), 1.27 (s, 9 H), 2.16 (p, $^3J_{HH}$=7.2 Hz, 2 H), 2.9–3.0 (m, 4 H), 3.68 (s, 1 H), 6.69 (s, 1 H), 7.3–7.5 (m, 4 H), 7.63 (d, $^3J_{HH}$=7.4 Hz, 2 H). $^{13}$C NMR ($CDCl_3$): d-0.32, –0.09, 26.28, 33.39,34.11, 46.46, 47.54, 49.81, 115.80, 119.30, 126.92, 127.89, 128.46, 132.99, 137.30, 140.20, 140.81, 141.64,142.08, 144.83.

6) Preparation of N-(1,1-Dimethylethyl)-1,1-dimethyl-1-(1,5,6,7-tetrahydro-3-phenyl-s-indacen-1-yl) silanamine, dilithium salt.

N-(1,1-Dimethylethyl)-1,1-dimethyl-1-(1,5,6,7-tetrahydro-3-phenyl-s-indacen-1-yl)silanamine (10.6551 g, 0.02947 moles) was stirred in hexane (100 mL) as nBuLi (0.070 moles, 35.00 mL of 2.0 M solution in cyclohexane) was added slowly. This mixture was then allowed to stir overnight during which time no salts crashed out of the dark red solution. After the reaction period the volatiles were removed and the residue quickly washed with hexane (2×50 mL). The dark red residue was then pumped dry and used without further purification or analysis (9.6517 g, 87.7 percent yield).

7) Preparation of Dichloro[N-(1,1-dimethylethyl)-1,1-dimethyl-1-[(1,2,3,4,5-h)-1,5,6,7-tetrahydro-3-phenyl-s-indacen-1-yl]silanaminato(2-)-N]titanium N-(1,1-Dimethylethyl)-1,1-dimethyl-1-(1,5,6,7-tetrahydro-3-phenyl-s-indacen-1-yl)silanamine, dilithium salt (4.5355 g, 0.01214 moles) in THF (50 mL) was added dropwise to a slurry of TiCl$_3$(THF)$_3$ (4.5005 g, 0.01214 moles) in THF (100 mL). This mixture was allowed to stir for 2 hours. PbCl$_2$ (1.7136 g, 0.006162 moles) was then added and the mixture allowed to stir for an additional hour. After the reaction period the volatiles were removed and the residue extracted and filtered using toluene. Removal of the toluene resulted in the isolation of a dark residue. This residue was then slurried in hexane and cooled to 0° C. The desired product was then isolated via filtration as a red-brown crystalline solid (2.5280 g, 43.5 percent yield).

$^1$H NMR (CDCl$_3$): d0.71 (s, 3 H), 0.97 (s, 3 H), 1.37 (s, 9 H), 2.0–2.2 (m, 2 H), 2.9–3.2 (m, 4 H), 6.62 (s, 1 H), 7.35–7.45 (m, 1 H), 7.50 (t, $^3J_{HH}$=7.8 Hz, 2 H), 7.57 (s, 1 H), 7.70 (d, $^3J_{HH}$=7.1 Hz, 2 H), 7.78 (s, 1 H). $^1$H NMR (C$_6$D$_6$): d0.44 (s, 3 H), 0.68 (s, 3 H), 1.35 (s, 9 H), 1.6–1.9 (m, 2 H), 2.5–3.9 (m, 4 H), 6.65 (s, 1 H), 7.1–7.2 (m, 1 H), 7.24 (t, $^3J_{HH}$=7.1 Hz, 2 H), 7.61 (s, 1 H), 7.69 (s, 1 H), 7.77–7.8 (m, 2 H). $^{13}$C NMR (CDCl$_3$): d1.29, 3.89, 26.47, 32.62, 32.84, 32.92, 63.16, 98.25, 118.70, 121.75, 125.62,128.46, 128.55, 128.79,129.01, 134.11, 134.53,136.04, 146.15, 148.93. $^{13}$C NMR (C$_6$D$_6$): d0.90, 3.57, 26.46, 32.56, 32.78, 62.88, 98.14, 119.19, 121.97, 125.84, 127.15, 128.83, 129.03, 129.55, 134.57, 135.04, 136.41, 136.51, 147.24, 148.96.

8) Preparation of Dimethyl[N-(1,1-dimethylethyl)-1,1-dimethyl-1-[(1,2,3,4,5-h)-1,5,6,7-tetrahydro-3-phenyl-s-indacen-1-yl]silanaminato(2-)-N]titanium Dichloro[N-(1,1-dimethylethyl)-1,1-dimethyl-1-[(1,2,3,4,5-h)-1,5,6,7-tetrahydro-3-phenyl-s-indacen-1-yl]silanaminato(2-)-N]titanium (0.4970 g, 0.001039 moles) was stirred in diethylether (50 mL) as MeMgBr (0.0021 moles, 0.70 mL of 3.0 M solution in diethylether) was added slowly. This mixture was then stirred for 1 hour. After the reaction period the volatiles were removed and the residue extracted and filtered using hexane. Removal of the hexane resulted in the isolation of the desired product as a golden yellow solid (0.4546 g, 66.7 percent yield).

$^1$H NMR (C$_6$D$_6$): d0.071 (s, 3 H), 0.49 (s, 3 H), 0.70 (s, 3 H), 0.73 (s, 3 H), 1.49 (s, 9 H), 1.7–1.8 (m, 2 H), 2.5–2.8 (m, 4 H), 6.41 (s, 1 H), 7.29 (t, $^3J_{HH}$=7.4 Hz, 2 H), 7.48 (s, 1 H), 7.72 (d, $^3J_{HH}$=7.4 Hz, 2 H), 7.92 (s, 1 H). $^{13}$C NMR (C$_6$D6): d2.19, 4.61, 27.12, 32.86, 33.00, 34.73, 58.68, 58.82, 118.62, 121.98, 124.26, 127.32, 128.63, 128.98, 131.23, 134.39, 136.38, 143.19, 144.85.

Polymerization for ESI #'s 5–6

ESI's 5–6 were prepared in a 6 gallon (22.7 L), oil jacketed, Autoclave continuously stirred tank reactor (CSTR). A magnetically coupled agitator with Lightning A-320 impellers provided the mixing. The reactor ran liquid full at 475 psig (3,275 kPa). Process flow was in at the bottom and out of the top. A heat transfer oil was circulated through the jacket of the reactor to remove some of the heat of reaction. At the exit of the reactor was a micromotion flow meter that measured flow and solution density. All lines on the exit of the reactor were traced with 50 psi (344.7 kPa) steam and insulated.

Toluene solvent was supplied to the reactor at 30 psig (207 kPa). The feed to the reactor was measured by a Micro-Motion mass flow meter. A variable speed diaphragm pump controlled the feed rate. At the discharge of the solvent pump, a side stream was taken to provide flush flows for the catalyst injection line (1 lb/hr (0.45 kg/hr)) and the reactor agitator (0.75 lb/hr (0.34 kg/hr)). These flows were measured by differential pressure flow meters and controlled by manual adjustment of microflow needle valves. Uninhibited styrene monomer was supplied to the reactor at 30 psig (207 kpa). The feed to the reactor was measured by a Micro-Motion mass flow meter. A variable speed diaphragm pump controlled the feed rate. The styrene stream was mixed with the remaining solvent stream.

Ethylene was supplied to the reactor at 600 psig (4,137 kPa). The ethylene stream was measured by a Micro-Motion mass flow meter just prior to the Research valve controlling flow. A Brooks flow meter/controller was used to deliver hydrogen into the ethylene stream at the outlet of the ethylene control valve. The ethylene/hydrogen mixture combines with the solvent/styrene stream at ambient temperature. The temperature of the solvent/monomer as it enters the reactor was dropped to ~5 ° C. by an exchanger with –5° C. glycol on the jacket. This stream entered the bottom of the reactor.

The three component catalyst system and its solvent flush also entered the reactor at the bottom but through a different port than the monomer stream. Preparation of the catalyst components took place in an inert atmosphere glove box. The diluted components were put in nitrogen padded cylinders and charged to the catalyst run tanks in the process area. From these run tanks the catalyst was pressured up with piston pumps and the flow was measured with Micro-Motion mass flow meters. These streams combine with each other and the catalyst flush solvent just prior to entry through a single injection line into the reactor.

Polymerization was stopped with the addition of catalyst kill (water mixed with solvent) into the reactor product line after the micromotion flow meter measuring the solution density. Other polymer additives can be added with the catalyst kill. A static mixer in the line provided dispersion of the catalyst kill and additives in the reactor effluent stream. This stream next entered post reactor heaters that provide additional energy for the solvent removal flash. This flash occurred as the effluent exited the post reactor heater and the pressure was dropped from 475 psig (3,275 kPa) down to ~250 mm of pressure absolute at the reactor pressure control valve. This flashed polymer entered a hot oil jacketed devolatilizer. Approximately 85 percent of the volatiles were removed from the polymer in the devolatilizer. The volatiles exited the top of the devolatilizer. The stream was condensed with a glycol jacketed exchanger and entered the suction of a vacuum pump and was discharged to a glycol jacket solvent and styrene/ethylene separation vessel. Solvent and styrene were removed from the bottom of the vessel and ethylene from the top. The ethylene stream was measured with a Micro-Motion mass flow meter and analyzed for composition. The measurement of vented ethylene plus a calculation of the dissolved gasses in the solvent/styrene stream were used to calculate the ethylene conversion. The polymer separated in the devolatilizer was pumped out with a gear pump to a ZSK-30 devolatilizing vacuum extruder. The dry polymer exits the extruder as a single strand. This strand was cooled as it was pulled through a water bath. The excess water was blown from the strand with air and the strand was chopped into pellets with a strand chopper.

Preparation of ESI # 7 and 8

ESI-7 and 8 were substantially random ethylene/styrene interpolymers prepared using the following catalyst and polymerization procedures.

Preparation of Catalyst B;(1H-cyclopenta[1]phenanthrene-2-yl)dimethyl(t-butylamido)-silanetitanium 1,4-diphenylbutadiene)

1) Preparation of lithium 1H-cyclopenta[1]phenanthrene-2-yl

To a 250 ml round bottom flask containing 1.42 g (0.00657 mole) of 1 H-cyclopenta[1]phenanthrene and 120 ml of benzene was added dropwise, 4.2 ml of a 1.60 M solution of n-BuLi in mixed hexanes. The solution was allowed to stir overnight. The lithium salt was isolated by filtration, washing twice with 25 ml benzene and drying under vacuum. Isolated yield was 1.426 g (97.7 percent). 1H NMR analysis indicated the predominant isomer was substituted at the 2 position.

2) Preparation of (1H-cyclopenta[1]phenanthrene-2-yl) dimethylchlorosilane

To a 500 ml round bottom flask containing 4.16 g (0.0322 mole) of dimethyldichlorosilane ($Me_2SiCl_2$) and 250 ml of tetrahydrofuran (THF) was added dropwise a solution of 1.45 g (0.0064 mole) of lithium 1 H-cyclopenta[1] phenanthrene- 2-yl in THF. The solution was stirred for approximately 16 hours, after which the solvent was removed under reduced pressure, leaving an oily solid which was extracted with toluene, filtered through diatomaceous earth filter aid (Celite™), washed twice with toluene and dried under reduced pressure. Isolated yield was 1.98 g (99.5 percent).

3. Preparation of (1H-cyclopenta[1]phenanthrene-2-yl) dimethyl(t-butylamino)silane To a 500 ml round bottom flask containing 1.98 g (0.0064 mole) of (1H-cyclopenta[1]phenanthrene-2-yl) dimethylchlorosilane and 250 ml of hexane was added 2.00 ml (0.0160 mole) of t-butylamine. The reaction mixture was allowed to stir for several days, then filtered using diatomaceous earth filter aid (Celite™). washed twice with hexane. The product was isolated by removing residual solvent under reduced pressure. The isolated yield was 1.98 g (88.9 percent).

4. Preparation of dilithio (1H-cyclopenta[1]phenanthrene-2-yl)dimethyl(t-butylamido)silane To a 250 ml round bottom flask containing 1.03 g (0.0030 mole) of (1H-cyclopenta[1]phenanthrene-2-yl)dimethyl(t-butylamino)silane) and 120 ml of benzene was added dropwise 3.90 ml of a solution of 1.6 M n-BuLi in mixed hexanes. The reaction mixture was stirred for approximately 16 hours. The product was isolated by filtration, washed twice with benzene and dried under reduced pressure. Isolated yield was 1.08 g (100 percent).

5. Preparation of (1H-cyclopenta[1]phenanthrene-2-yl) dimethyl(t-butylamido)silanetitanium dichloride To a 250 ml round bottom flask containing 1.17 g (0.0030 mole) of $TiCl_3 \cdot 3THF$ and about 120 ml of THF was added at a fast drip rate about 50 ml of a THF solution of 1.08 g of dilithio (1H-cyclopenta[1]phenanthrene-2-yl)dimethyl(t-butylamido)silane. The mixture was stirred at about 20° C. for 1.5 h at which time 0.55 gm (0.002 mole) of solid $PbCl_2$ was added. After stirring for an additional 1.5 h the THF was removed under vacuum and the reside was extracted with toluene, filtered and dried under reduced pressure to give an orange solid. Yield was 1.31 g (93.5 percent).

6. Preparation of (1H-cyclopenta[1]phenanthrene-2-yl) dimethyl(t-butylamido) silanetitanium 1,4-diphenylbutadiene To a slurry of (1H-cyclopenta[1]phenanthrene-2-yl) dimethyl(t-butylamido)silanetitanium dichloride (3.48 g, 0.0075 mole) and 1.551 gm (0.0075 mole) of 1,4-diphenyllbutadiene in about 80 ml of toluene at 70° C. was add 9.9 ml of a 1.6 M solution of n-BuLi (0.0150 mole). The solution immediately darkened. The temperature was increased to bring the mixture to reflux and the mixture was maintained at that temperature for 2 hrs. The mixture was cooled to about –20° C. and the volatiles were removed under reduced pressure. The residue was slurried in 60 ml of mixed hexanes at about 20° C. for approximately 16 hours. The mixture was cooled to about –25° C. for about 1 h. The solids were collected on a glass frit by vacuum filtration and dried under reduced pressure. The dried solid was placed in a glass fiber thimble and solid extracted continuously with hexanes using a soxhlet extractor. After 6 h a crystalline solid was observed in the boiling pot. The mixture was cooled to about –20° C., isolated by filtration from the cold mixture and dried under reduced pressure to give 1.62 g of a dark crystalline solid. The filtrate was discarded. The solids in the extractor were stirred and the extraction continued with an additional quantity of mixed hexanes to give an additional 0.46 gm of the desired product as a dark crystalline solid.

Polymerization for ESI 7–8

ESI 7–8 were prepared in a continuously operating loop reactor (36.8 gal. 139 L). An Ingersoll-Dresser twin screw pump provided the mixing. The reactor ran liquid full at 475 psig (3,275 kPa) with a residence time of approximately 25 minutes. Raw materials and catalyst/cocatalyst flows were fed into the suction of the twin screw pump through injectors and Kenics static mixers. The twin screw pump discharged into a 2" diameter line which supplied two Chemineer-Kenics 10-68 Type BEM Multi-Tube heat exchangers in series. The tubes of these exchangers contained twisted tapes to increase heat transfer. Upon exiting the last exchanger, loop flow returned through the injectors and static mixers to the suction of the pump. Heat transfer oil was circulated through the exchangers' jacket to control the loop temperature probe located just prior to the first exchanger. The exit stream of the loop reactor was taken off between the two exchangers. The flow and solution density of the exit stream was measured by a MicroMotion.

Solvent feed to the reactor was supplied by two different sources. A fresh stream of toluene from an 8480-S-E Pulsafeeder diaphragm pump with rates measured by a Micro-Motion flowmeter was used to provide flush flow for the reactor seals (20 lb/hr (9.1 kg/hr). Recycle solvent was mixed with uninhibited styrene monomer on the suction side of five 8480-5-E Pulsafeeder diaphragm pumps in parallel. These five Pulsafeeder pumps supplied solvent and styrene to the reactor at 650 psig (4,583 kPa). Fresh styrene flow was measured by a MicroMotion flowmeter, and total recycle solvent/styrene flow was measured by a separate MicroMotion flowmeter. Ethylene was supplied to the reactor at 687 psig (4,838 kPa). The ethylene stream was measured by a Micro-Motion mass flowmeter. A Brooks flowmeter/controller was used to deliver hydrogen into the ethylene stream at the outlet of the ethylene control valve.

The ethylene/hydrogen mixture combined with the solvent/styrene stream at ambient temperature. The temperature of the entire feed stream as it entered the reactor loop was lowered to 2° C. by an exchanger with –10° C. glycol on the jacket. Preparation of the three catalyst components took place in three separate tanks: fresh solvent and concentrated catalyst/cocatalyst premix were added and mixed into their respective run tanks and fed into the reactor via variable speed 680-S-AEN7 Pulsafeeder diaphragm pumps. As previously explained, the three component catalyst system entered the reactor loop through an injector and static mixer into the suction side of the twin screw pump. The raw material feed stream was also fed into the reactor loop through an injector and static mixer downstream of the catalyst injection point but upstream of the twin screw pump suction.

Polymerization was stopped with the addition of catalyst kill (water mixed with solvent) into the reactor product line after the Micro Motion flowmeter measuring the solution density. A static mixer in the line provided dispersion of the catalyst kill and additives in the reactor effluent stream. This stream next entered post reactor heaters that provided additional energy for the solvent removal flash. This flash occurred as the effluent exited the post reactor heater and the pressure was dropped from 475 psig (3,275 kPa) down to 450 mmHg (60 kPa) of absolute pressure at the reactor pressure control valve.

This flashed polymer entered the first of two hot oil jacketed devolatilizers. The volatiles flashing from the first devolatizer were condensed with a glycol jacketed exchanger, passed through the suction of a vacuum pump, and were discharged to the solvent and styrene/ethylene separation vessel. Solvent and styrene were removed from the bottom of this vessel as recycle solvent while ethylene exhausted from the top. The ethylene stream was measured with a MicroMotion mass flowmeter. The measurement of vented ethylene plus a calculation of the dissolved gases in the solvent/styrene stream were used to calculate the ethylene conversion. The polymer and remaining solvent separated in the devolatilizer was pumped with a gear pump to a second devolatizer. The pressure in the second devolatizer was operated at 5 mm Hg (0.7 kPa) absolute pressure to flash the remaining solvent. This solvent was condensed in a glycol heat exchanger, pumped through another vacuum pump, and exported to a waste tank for disposal. The dry polymer (<1000 ppm total volatiles) was pumped with a gear pump to an underwater pelletizer with 6-hole die, pelletized, spin-dried, and collected in 1000 lb boxes.

The various catalysts, co-catalysts and process conditions used to prepare the various individual ethylene styrene interpolymers (ESI #'s 5–8) are summarized in Table 8 and their properties are summarized in Table 9.

Examples 5–9

Open Cell Foams With PS/ESI Blends, Using Isobutane As Blowing Agent

A foaming process comprising a single-screw extruder, mixer, coolers and die was used to make foam. Isobutane was used as the blowing agent at a loading of 7.5 part-per-hundred-resin (phr) for Examples 5–8 and 8 wt percent for Example 9 to foam polystyrene (PS) and PS/ESI blends.

TABLE 10

Open Cell Foams With PS/ESI Blends, Using Isobutane As Blowing Agent

| Ex # | Blend Composition (wt %) | foaming temp (° C.) | foam density (kg/m$^3$) | open cells (vol %) | cell size ($\mu$m) |
|---|---|---|---|---|---|
| Ex 5 | 80% PS1/20% ESI 5 | 127 | 37 | 61[a] | 71 |
| Ex 6 | 80% PS1/20% ESI 5 | 122 | 42 | 22[a] | 55 |
| Ex 7 | 80% PS1/20% ESI 6 | 130 | 33 | 50[a] | 75 |
| Ex 8 | 80% PS1/20% ESI 6 | 117 | 41 | 25[a] | 67 |
| Ex 9 | 40% PS1/60% ESI 8 | 113 | 32 | 31[b] | 780 |
| Comp Expt 1 | 100 wt % PS 1 | 127 | 52 | 1[a] | 48 |

[a]Experimental procedure described herein
[b]ASTM D2856

TABLE 8

| ESI # | Reactor Temp ° C. | Solvent Flow lb/hr (kg/hr) | Ethylene Flow lb/hr (kg/hr) | Hydrogen Flow sccm | Styrene Flow lb/hr (kg/hr) | Ethylene Conversion % | B/Ti Ratio | MMAO[d]/Ti Ratio | Catalyst | Co-Catalyst |
|---|---|---|---|---|---|---|---|---|---|---|
| ESI 5 - | 93.0 | 37.9 (17.2) | 3.1 (1.4) | 13.5 | 6.9 (3.1) | 96.2 | 2.99 | 7.0 | A[a] | C[c] |
| ESI 6 | 79.0 | 31.3 (14.2) | 1.7 (0.8) | 4.3 | 13.5 (6.1) | 95.1 | 3.51 | 9.0 | A[a] | C[c] |
| ESI-7 | 61 | 386 (175.0) | 20.0 (9.1) | 0 | 100.0 (45.3) | 88 | 3.50 | 2.5 | Bb | C[c] |
| ESI-8 | 86 | 743 (337) | 84.0 (38.1) | 801 | 162.0 (73.5) | 91.8 | 4.0 | 6.0 | Bb | C[c] |

*N/A = not available
a Catalyst A is dimethyl [N-(1,1-dimethylethyl)-1,1-dimethyl-1-[(1,2,3,4,5-h)-1,5,6,7-tetrahydro-3-phenyl-s-indacen-1-yl]silanaminato(2-)-N]-titanium.
b Catalyst B is ;(1H-cyclopenta[1]phenanthrene-2-yl)dimethyl(t-butylamido)-silanetitanium 1,4-diphenylbutadiene)
c Cocatalyst C is tris(pentafluorophenyl)borane, (CAS# 001109-15-5),.
d a modified methylaluminoxane commercially available from Akzo Nobel as MMAO-3A (CAS# 146905-79-5)

TABLE 9

| ESI # | wt. % Copolymer Styrene | mol. % Copolymer Styrene | aPS wt % | Melt Index, I$_2$ (g/10 min) | Gottfert No. (cm$^3$/10 min) |
|---|---|---|---|---|---|
| ESI-5 | 47.4 | 19.5 | 0.5 | | 1.54 |
| ESI-6 | 69.0 | 37.5 | 1.6 | | 1.36 |
| ESI-7 | 69.5 | 38.0 | 8.9 | 0.94 | |
| ESI-8 | 57.2 | 26.5 | 2.1 | 0.40 | |

Polystyrene Blend Components

PS 1 is a granular polystyrene having a weight average molecular weight, Mw, of about 192,000 and a polydispersity, $M_w/M_n$, of about 2.

Examples 10–11

Open Cell Foams with PS/ESI Blends, Using $CO_2$ as Blowing Agent

A foaming process comprising a single-screw extruder, mixer, coolers and die was used to make foam planks. Carbon dioxide ($CO_2$) was used as the blowing agent at a level of 4.7 phr to foam a blend of polystyrene with ESI-7. The other additives were: fire retardant=2.5 phr; processing aid=0.2 phr; pigment=0.15 phr: acid scavenger=0.2 phr; and linear low density polyethylene=0.4 phr.

TABLE 11

Open Cell Foams with PS/ESI blends, using $CO_2$ as blowing agent

| Ex # | Blend Composition (wt %) | foam temp (°C.) | foam density (kg/m³) | % open cell[a] | cell size μm | Water Abs (g/g foam) |
|---|---|---|---|---|---|---|
| Ex 10 | 80% PS1/20% ESI 7 | 119 | 40. | 90 | 300 | 13.6 |
| Ex 11 | 80% PS1/20% ESI 7 | 117 | 43 | 78 | 300 | — |

[a]ASTM D2856

Examples 12
Open Cell Foams with PS/ESI Blends Using HFC-134a/$CO_2$ Mixture as Blowing Agent A foaming process comprising a single-screw extruder, mixer, coolers and die was used to make foam planks. A mixture of 1.1 phr HFC-134a and 4.23 phr carbon dioxide ($CO_2$) was used as the blowing agent to foam a blend of polystyrene with ESI. The other additives were: flame retardant=2.5 phr; processing aid=0.2 phr; pigment=0.15 phr; and acid scavenger=0.2 phr.

TABLE 12

Open Cell Foams with PS/ESI blends, using HFC-134a/$CO_2$ as blowing agent

| Ex # | Blend Composition (wt %) | foam temp °C. | foam density kg/m³ | % open cells[a] | cell size μm | Water Abs with skin (g/g foam) | Water Abs w/o skin (g/g foam) |
|---|---|---|---|---|---|---|---|
| Ex 12 | 80% PS1/20% ESI7 | 125 | 45 | 93 | 290 | 13 | 37 |

[a]ASTM D2856

The Examples and Comparative Examples of Tables 10, 11 and 12 demonstrate that foams made from blends of polystyrene with substantially random ethylene/styrene interpolymers surprisingly have high open cell contents (at least 20 vol percent cell) over a wide range of compositions and foaming temperatures.

What is claimed is:

1. A open cell foam, comprising;
   (A) from about 30 to about 99.5 percent by weight (based on the combined weights of Component A and B) of one or more alkenyl aromatic polymers, and wherein at least one of said alkenyl aromatic polymers has a molecular weight ($M_w$) of from about 100,000 to about 500,000; and
   (B) from about 0.5 to about 70 percent by weight (based on the combined weight of Components A and B) of one or more substantially random interpolymers having an $I_2$ of about 0.1 to about 50 g/10 min, an $M_w/M_n$ of about 1.5 to about 20; comprising;
      (1) from about 0.5 to about 65 mol percent of polymer units derived from;
         (a) at least one vinyl or vinylidene aromatic monomer, or
         (b) at least one hindered aliphatic or cycloaliphatic vinyl or vinylidene monomer, or
         (c) a combination of at least one aromatic vinyl or vinylidene monomer and at least one hindered aliphatic or cycloaliphatic vinyl or vinylidene monomer, and
      (2) from about 35 to about 99.5 mol percent of polymer units derived from at least one of ethylene and/or a $C_{3-20}$ α-olefin; and
      (3) from 0 to about 20 mol percent of polymer units derived from one or more ethylenically unsaturated polymerizable monomers other than those derived from (1) and (2); and
   (C) optionally, one or more nucleating agents and
   (D) optionally, one or more other additives; and
   (E) one or more blowing agents present in a total amount of from about 0.5 to about 5.0 gram-moles per kilogram (based on the combined weight of Components A and B).

2. The open cell foam of claim 1, wherein
   A) in Component (A), said at least one alkenyl aromatic polymer has greater than 50 percent by weight alkenyl aromatic monomeric units, has a molecular weight ($M_w$) of from about 120,000 to about 350,000 and is present in an amount of from about 50 to about 99.5 percent by weight (based on the combined weight of Components A and B);
   B) said substantially random interpolymer, Component (B), has an $I_2$ of about 0.3 to about 30 g/10 min and an $M_w/M_n$ of about 1.8 to about 10; is present in an amount of from about 0.5 to about 50 percent by weight (based on the combined weight of Components A and B); and comprises
      (1) from about 15 to about 50 mol percent of polymer units derived from;
         (a) said vinyl or vinylidene aromatic monomer represented by the following formula;

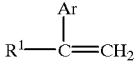

wherein $R^1$ is selected from the group of radicals consisting of hydrogen and alkyl radicals containing three carbons or less, and Ar is a phenyl group or a phenyl group substituted with from 1 to 5 substituents selected from the group consisting of halo, $C_{1-4}$-alkyl, and $C_{1-4}$-haloalkyl; or
         (b) said sterically hindered aliphatic or cycloaliphatic vinyl or vinylidene monomer is represented by the following general formula;

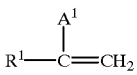

wherein $A^1$ is a sterically bulky, aliphatic or cycloaliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and $A^1$ together form a ring system; or c) a combination of a and b; and
(2) from about 50 to about 85 mol percent of polymer units derived from ethylene and/or said α-olefin which comprises at least one of propylene, 4-methyl-1-pentene, butene-1, hexene-1 or octene-1; and
(3) said ethylenically unsaturated polymerizable monomers other than those derived from (1) and (2) comprises norbornene, or a $C_{1-10}$ alkyl or $C_{6-10}$ aryl substituted norbornene; and (C) said nucleating agent, if present, Component (C), comprises one or more of calcium carbonate, talc, clay, silica, barium stearate, calcium stearate diatomaceous earth, mixtures of citric acid and sodium bicarbonate; and (D) said additive, if present, Component (D), comprises one or more of inorganic fillers, pigments, antioxidants, acid scavengers, ultraviolet absorbers, flame retardants, processing aids, extrusion aids, permeability modifiers, antistatic agents, and other thermoplastic polymers;

(E) said blowing agent, Component (E), is present in a total amount of from about 0.2 to about 4.0 g-moles/kg (based on the combined weight of Components A and B), and comprises one or more of inorganic blowing agent(s), organic blowing agent(s), and/or chemical blowing agent(s).

3. The open cell foam of claim 1; wherein
(A) in Component (A), said at least one alkenyl aromatic polymer has greater than about 70 percent by weight alkenyl aromatic monomeric units, has a molecular weight ($M_w$) of from about 130,000 to about 325,000, a molecular weight distribution, ($M_w/M_n$) of from about 2 to about 7, and is present in an amount of from about 80 to about 99.5 percent by weight (based on the combined weight of Components A and B);

(B) said substantially random interpolymer, Component (B), has an $I_2$ of about 0.5 to about 10 g/10 min and an $M_w/M_n$ from about 2 to about 5, is present in an amount from about 0.5 to about 20 wt percent (based on the combined weight of Components A and B) and comprises
(1) from about 30 to about 50 mol percent of polymer units derived from;
a) said vinyl aromatic monomer which comprises styrene, α-methyl styrene, ortho-, meta-, and para-methylstyrene, and the ring halogenated styrenes, or
b) said aliphatic or cycloaliphatic vinyl or vinylidene monomers which comprises 5-ethylidene-2-norbornene or 1-vinylcyclo-hexene, 3-vinylcyclohexene, and 4-vinylcyclohexene; or
c) a combination of a and b; and
(2) from about 50 to about 70 mol percent of polymer units derived from ethylene, or a combination of ethylene and said α-olefin, which comprises ethylene, or ethylene and at least one of propylene, 4-methyl-1-pentene, butene-1, hexene-1 or octene-1; and
(3) said ethylenically unsaturated polymerizable monomers other than those derived from (1) and (2) is norbornene; and (C) said nucleating agent, if present, Component (C), comprises one or more of talc, silica, and mixtures of citric acid and sodium bicarbonate;

(D) said additive, if present, Component (D), comprises one or more of carbon black, titanium dioxide, graphite, flame retardants, and other thermoplastic polymers; and (E) said blowing agent, Component (E), is present in a total amount of from about 0.5 to about 3.0 gram-moles per kilogram (based on the combined weight of Components A and B) comprising one or more of, nitrogen, sulfur hexafluoride ($SF_6$), argon, carbon dioxide, water, air and helium, methane, ethane, propane, n-butane, isobutane, n-pentane, isopentane, neopentane, cyclopentane, methanol, ethanol, n-propanol, and isopropanol, methyl fluoride, perfluoromethane, ethyl fluoride, ), 1,1-difluoroethane (HFC-152a), fluoroethane (HFC-161), 1,1,1-trifluoroethane (HFC-143a), 1,1,1,2-tetrafluoroethane (HFC-134a), pentafluoroethane (HFC-125), 1,1,2,2 tetrafluoroethane (HFC-134), 1,1,1,3,3-pentafluoropropane, difluoromethane (HFC-32), perfluoroethane, 2,2-difluoropropane, 1,1,1-trifluoropropane, perfluoropropane, dichloropropane, difluoropropane, perfluorobutane, perfluorocyclobutane, methyl chloride, methylene chloride, ethyl chloride, 1,1,1-trichloro-ethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124), trichloromonofluoromethane (CFC-11), dichlorodifluoromethane (CFC-12), trichlorotrifluoroethane (CFC-113), dichlorotetrafluoroethane (CFC-114), chloroheptafluoropropane, dichlorohexafluoropropane, azodicarbonamide, azodiisobutyro-nitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosotere-phthalamide. trihydrazino triazine and mixtures of citric acid and sodium bicarbonate.

4. The open cell foam of claim 3, wherein said alkenyl aromatic polymer, Component (A), is polystyrene, said substantially random interpolymer, Component (B), is an ethylene/styrene interpolymer, and the blowing agent, Component (E), is one or more of carbon dioxide, ethane, propane, n-butane, isobutane, n-pentane, isopentane, neopentane, cyclopentane, ethanol, 1,1-difluoroethane (HFC-152a), 1,1,1,2-tetrafluoroethane (HFC-134a), 1,1,2,2 tetrafluoroethane (HFC-134), ethyl chloride, 1-chloro-1,1-difluoroethane (HCFC-142b), or chlorodifluoromethane (HCFC-22).

5. The open cell foam of claim 3, wherein said alkenyl aromatic polymer, Component (A), is polystyrene, in said substantially random interpolymer Component B1(a) is styrene; and Component B2 is ethylene and at least one of propylene, 4-methyl-1-pentene, butene-1, hexene-1 or octene-1, and the blowing agent, Component (E), is one or more of carbon dioxide, ethane, propane, n-butane, isobutane, n-pentane, isopentane, neopentane, cyclopentane, ethanol, 1,1-difluoroethane (HFC-152a), 1,1,1,2-tetrafluoroethane (HFC-134a), 1,1,2,2 tetrafluoroethane (HFC-134), ethyl chloride, 1-chloro-1,1-difluoroethane (HCFC-142b), or chlorodifluoromethane (HCFC-22).

6. The foam of claim 1, having a density of from about 10 to about 200 kilograms per cubic meter ($kg/m^3$) and a cell size of about 5 to about 2000 microns.

7. The open cell foam of claim 1, having a density of from about 15 to about 100 $kg/m^3$ and a cell size of about 20 to about 1000 microns.

8. The open cell foam of claim 1, wherein the alkenyl aromatic polymer material comprises greater than about 70 percent by weight of alkenyl aromatic monomeric units, and the foam has a density of from about 10 to about 200 kilograms per cubic meter ($kg/m^3$) and a cell size of about 5 to about 2000 microns.

9. The open cell foam of claim 1, wherein the alkenyl aromatic polymer material comprises greater than 70 percent by weight of alkenyl aromatic monomeric units and the foam has a density of from about 15 to about 100 $kg/m^3$ and a cell size of about 20 to about 1000 microns.

10. The open cell foam of claim 1 having a water absorption value of from about 5 to about 25 g/g foam.

* * * * *